United States Patent [19]

Glass et al.

[11] Patent Number: 4,604,287

[45] Date of Patent: Aug. 5, 1986

[54] MULTIPLE TEXTURED CHEWING GUM

[75] Inventors: Michael Glass, Fairlawn; Joseph Hoholick, Bridgewater; Alfred Oppenheimer, Randolph; Amy Dombroski, Budd Lake, all of N.J.

[73] Assignee: Warner-Lambert Company, Morris Plains, N.J.

[21] Appl. No.: 742,279

[22] Filed: Jun. 7, 1985

[51] Int. Cl.$^4$ ............................................... A23G 3/30
[52] U.S. Cl. ........................................ 426/5; 426/548; 426/804
[58] Field of Search ................... 426/3, 658, 548, 804

[56] References Cited

U.S. PATENT DOCUMENTS

| | | | |
|---|---|---|---|
| 4,161,544 | 7/1979 | Kaul | 426/3 |
| 4,208,431 | 6/1980 | Friello et al. | 426/3 |
| 4,217,368 | 8/1980 | Witzel et al. | 426/3 |
| 4,238,475 | 12/1980 | Witzel et al. | 426/3 |
| 4,371,549 | 2/1983 | Cherukuri et al. | 426/3 |
| 4,514,422 | 4/1985 | Yang | 426/3 |

*Primary Examiner*—Jeanette Hunter
*Attorney, Agent, or Firm*—Gary M. Nath; Howard Olevsky

[57] ABSTRACT

A chewing gum composition having an initial soft-short texture lacking elasticity which converts upon chewing to a soft elastic-cohesive chewing gum which comprises an anhydrous admixture of a gum base, sweetening agent, softener and about 0.75% to about 6% by weight, a maltodextrin binder having a D.E. value of about 7 to about 24.

14 Claims, No Drawings

MULTIPLE TEXTURED CHEWING GUM

The present invention relates to a chewing gum composition which initially has a relatively soft, non-elastic texture which facilitates easy bite and upon chewing converts to a soft elastic, cohesive chewing gum texture having good flavor release. More particularly, the invention relates to the foregoing chewing gum composition which is substantially anhydrous and which contains a specific maltodextrin binder.

Chewing gums and bubble gums have been prepared in the past to exhibit various textures, film forming properties, flavor release rates and storage stabilities. The compositions of these products are tailored to enable a material to be prepared which would hopefully be acceptable for ultimate consumer usage.

U.S. Pat. No. 2,973,273 to Curtiss discloses a sponge chewing gum product which comprises a chewing gum having a plurality of cavities thereby forming a spongy mass. The cavities are filled with a soft confectionery such as ice cream and the product frozen until used. In contrast, U.S. Pat. No. 4,271,198 to Cherukuri, et al, discloses a chewing gum product which has a relatively hard texture making it easy to wrap and on storage changes to a relatively soft texture facilitating easy bite through. The chewing gum includes gum base, corn syrup solids and one or more liquid moisturizers initially separated from the corn syrup solids, together with optional sweeteners and bulking agents, softeners and the like.

Chewing gums and bubble gums have also been prepared in the past for the purpose of extending shelf life. Characteristically gums prepared and stored even at room temperature for extended periods of time tend to lose their moisture and elasticity, with the result that they become brittle, and initially crumble when they are placed in the mouth. This problem is particularly noticeable when gums are stored in a dry atmosphere, such as those having less than about 50 to 60% relative humidity.

Sugarless and sugar gums conventionally contain on the order of about 5% water, and it is therefore theorized that brittleness or the phenomenon of staling results from the loss of that water due to evaporation or otherwise over time. Specifically, most sugarless gums contain large amounts of sorbitol which serves conventionally as a sweetener as well as a bulking aid. In contrast sugar gums contain large amounts of sugar (dextrose). Sorbitol and dextrose are known to recrystallize in the presence of even small amounts of water, and tend to crystallize when the water in which it is dissolved is removed, making a crystalline/grainy product. It is therefore theorized that, as the water containing the sweetener in the gum composition is lost by evaporation or otherwise, the sweetener i crystallizes and thus promotes the embrittlement of the gum composition that contributes to the staling phenomenon. Thus far, the only workable approach to prolonging gum composition freshness relied on the use of fin-seal packaging with water vapor impermeable laminates to exclude all external ambient atmosphere and accompanying moisture and conversely to prevent loss of moisture from the package contents. The approach is very costly and has its limitations as periodic package leakage permits staling to occur unabetted as before.

The prior art has also disclosed chewing gum compositions which have low percentages of moisture in the final product. For the most part, the prior art has concentrated on driving off the water once the chewing gum formulation has been made. Thus, the prior art compositions ordinarily contain water and/or moisture-containing ingredients, such as sorbitol solution and corn syrup solutions and would therefore require heating or purification of the composition to drive off water and obtain a certain moisture content. For example, U.S. Pat. No. 4,035,572 involves a gum base formulation with less than 0.5% moisture. This low percentage of moisture is due to the purification process which removes water and solvent from the gum base.

U.S. Pat. No. 4,382,963 involves a low caloric chewing gum which uses polydextrose as the sole soluble bulking agent. The moisture content in the final product is about 1 to 5% and this is obtained by omitting the aqueous component, e.g., sorbitol syrups or corn syrups, which are normally used in chewing gum products. U.S. Pat. No. 4,150,161 concerns a two component confection having a carbonated candy component and a pliable bubble gum component with each component having a controlled water activity between 0.1% and 0.3% and which is capable of surviving long periods of storage when packaged in a moisture resistant material.

It is well known that conventional chewing gum formulations generally contain a chewing gum base, resins, waxes, fillers, emulsifiers, and aqueous sugar syrup (corn syrup or sorbitol syrup), dry sugar (sucrose or dextrose) and flavor. As a result of the use of aqueous sugar syrups and sorbitol syrups the chewing gum products ordinarily contain 2% to 7% by weight of moisture. Moreover, ingredients such as humectants were often required in order to retain the moisture of the chewing gums and obtain a reasonable commercial shelf life, thereby insuring freshness to the purchaser. The compositions of the instant invention do not use aqueous sugar syrups or sorbitol syrups and do not add ingredients that add additional amounts of water (moisture) to the final chewing gum composition when admixed with the gum base.

In accordance with the present invention, a chewing gum composition has been unexpectedly developed which is a substantially anhydrous admixture of a gum base, sweetening agent, softener and a maltodextrin binder, the latter present in the amount of about 0.75% to about a 6% by weight and having a D.E. value of about 7 to about 27, and wherein the composition has an initial soft-short texture lacking elasticity which converts upon chewing to a soft elastic-cohesive chewing gum.

As an alternate embodiment, it has been unexpectedly discovered that a rich chocolate flavored tasting chewing gum composition can be prepared which is stable for long periods of time, which composition comprises a substantially anhydrous admixture of a gum base, sweetening agent, softener and a maltodextrine binder present in the amount of about 0.75% to about 6% by weight, and having a D.E. value of about 7 to about 27 and flavoring comprising cocoa powder and chocolate wherein the composition has an initial soft-short texture lacking elasticity, which converts upon chewing to a soft elastic-cohesive chewing gum.

The chewing gum compositions of the invention must contain four essential ingredients, namely a gum base, sweetening agent, softener and a particular maltodextrin binder.

The gum bases useful in the present invention, include those gum bases utilized, respectively, for chewing gums or bubble gums. Both gum bases may employ a number of natural or synthetic resins as elastomeric materials. Thus, illustrative elastomers comprise synthetic gums or elastomers such as butadiene-styrene copolymers, polyisobutylene and isobutylene-isoprene copolymers; and natural gums or elastomers such as chicle, natural rubber, gelutong, balata, guttapercha, lechi caspi, sorva, guttakay, crown gum, perillo, guayule or mixtures thereof. Among these butadiene-styrene copolymer, polyisobutylene, isobutylene-isoprene copolymer or mixtures, are frequently used.

The gum base usually includes an elastomer solvent, which may be selected from terpene resins, such as polymers of alpha-pinene or beta-pinene; rosin derivatives including hydrogenated or partially hydrogenated derivatives, such as the glycerol ester of polymerized rosin, alcohol esters of rosin, such as the glycerol ester of hydrogenated rosin, the pentaerythritol ester of hydrogenated rosin, the pentaerythritol ester of partially hydrogenated rosin, the glyceryl esters of partially hydrogenated rosin, the glyceryl ester of rosin and mixtures thereof.

The gum base may include a non-toxic vinyl polymer, such as polyvinyl acetate and its partial hydroyzate, polyvinyl alcohol, and mixtures thereof. When utilized, the vinyl polymer may possess a gram mole molecular weight ranging from about 3,000 up to and including 94,000.

Naturally, the gum bases may be prepared for a variety of products, including conventional chewing gums and bubble gums, and the invention is not limited to a specific gum base formulation. The above description is therefore presented for purposes of illustration only. Regardless of the gum base employed, the gum composition of the present invention generally includes the gum base in an amount ranging from about 5% to about 45% by weight of the total composition.

The chewing gum compositions generally contain a major portion of the sweetening agent. Sweetening agents may be selected from a wide range of materials such as water-soluble sweetening agents, water-soluble artificial sweetening agents, and dipeptide-based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch, and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and materials described in U.S. Pat. No. 3,492,131 and the like.

The water-soluble sweetners described in category A above are preferably used in amounts of about 25% to about 75% by weight and most preferably from about 50% to about 65% by weight of the final chewing gum composition. In contrast, the artificial sweeteners described in categories B and C are used in amounts of about 0.005% to 5.0% and most preferably about 0.05% to about 2.5% by weight of the final chewing gum composition. The artificial sweeteners may also be used in combination with the water-soluble sweeteners described in category A. These amounts are ordinarily necessary to achieve a desired level of sweetness independent from the flavor level achieved from flavor oils.

As a preferred optional embodiment, it has been found useful to employ a multiple sweetener system that employs dextrose as one of the essential ingredients. The presence of dextrose appears to aid in the formation of the soft cohesive elastic product within a short time after the initial chew. Preferred amounts are from about 5% to about 15% by weight and most preferably from about 8% to about 12% by weight of the total formulation. The use of dextrose with or without additional sweeteners has been found to be preferred when making a chocolate flavored chewing gum composition. More particularly a rich tasting chocolate flavored material is produced when the dextrose is used in a ratio of 15 to 1 parts dextrose for each part of maltodextrin and preferably from 10 to 3 parts dextrose per part maltodextrin.

Useful softeners-plasticizers include lanolin, propylene glycol, triacetin, glycerine and the like, and mixtures thereof. These materials are essential ingredients to achieve the desired texture and consistency of the initial and final chewing gum compositions of this invention. Glycerin is the preferred softener in the compositions of the invention.

In accordance with the present invention, water is all but entirely deleted from the present compositions, and glycerin is added in amounts ranging from about 5% to about 18% by weight of the total composition.

Preferable, glycerin is present in amounts ranging from about 5% to about 15% by weight. The amount of water in the glycerin is critical only to the extent that the final gum composition include water in an amount not exceeding 3.0% by weight, and preferably less than about 2% by weight.

An essential ingredient of the inventive chewing gum compositions is the maltodextrin binder. The maltodextrin binder must be employed in amounts of about 0.75% to about 6% by weight of the total composition. Additionally, the maltodextrin must have a dextrose equivalence (D.E.) of about 7 to about 27. It has been unexpectedly found that when the maltodextrin is blended with the anhydrous gum base in the presence of sweeteners and softeners, a unique admixture is created which lacks the conventional chewing gum texture. Normal chewing gum is cohesive, and elastic in texture even though the composition may vary in its softness and hardness texture. These characteristics generally remain the same even during chewing, namely the conventional product remains cohesive and elastic even though the physical character can be modified with other well known agents, such as plasticizes, water content, sweetener content and so forth.

Unlike the prior art chewing gum compositions, the present formulations exhibit a unique initial soft confectionary-like texture which, upon chewing, converts to a conventional cohesive, elastic chewing gum product. In particular, the inventive compositions exhibit a soft, short texture virtually lacking elasticity prior to being chewed. This effect is believed to result from the combination of the four essential ingredients in anhydrous form, namely, gum base, sweetening agent, softener and particular maltodextrin. These ingredients, when admixed in the absence of added moisture, enable the formation of a product which resembles a dry homogenous blend. In the absence of water as free moisture, that is amounts of less than about 3% and preferably less than about 2%, the admixture maintains its soft, short texture and remains nonelastic and noncohesive. Once the gum is chewed, moisture in the saliva is permitted to solubilize the maltodextrin binder which then binds a portion of the solubilized sweetening agent to the insoluble gum base. This addition of moisture during chewing converts the soft, short textured product into a soft elastic, cohesive mass having all the soft texture of a conventional chewing gum. In addition, during the chewing procedure, flavoring agent is slowly and consistent-released and maintained for a longer time than expected, probably resulting from its ready access to the exterior environment during initial chew and subsequent entrapment within the chewing gum composition as the chew proceeds. The entire procedure of converting the soft, short texture into a chewing gum texture is achieved within the first few minutes of chew.

As discussed above, the maltodextrin binder must be present in an amount of about 0.75% to about 6% by weight and have a Dextrose Equivalence (D.E.) of about 7 to about 27. Preferred amounts are about 2% to about 5% by weight with a D.E. value of about 10 to about 24 and most preferably about 2.5% to about 4% by weight with a D.E. value of about 18 to about 24. It is critical to control both the amount of maltodextrin employed as well as the D.E. value in order to prepare the compositions of this invention. D.E. values below 7 result in a chewing gum product that possesses initial cohesive texture. At values above 27 a product is produced that is extremely soft, basically lacking texture.

It has also been found that as the D.E. value is lowered within the useful range from 27 to 7, it is also preferred to lower the amount of maltodextrin that is employed. Likewise, as the D.E. value is raised, the amount of maltodextrin added is preferably increased in order to achieve the desired initial and subsequent gum textures.

The chewing gum composition of this invention may include conventional additives such as coloring agents, emulsifiers, fillers, flavoring agents and so forth and mixtures thereof. Suitable fillers include calcium carbonate, magnesium carbonate, alumina, aluminum hydroxide, aluminum silicate, talc, tricalcium phosphate, dicalcium phosphate dihydrate and the like, as well as mixtures thereof. When used, the amount of filler should be about 5% to about 25% by weight.

Flavoring agent well known in the chewing gum art may be added to the chewing gum compositions of the instant invention. These flavoring agents may be chosen from synthetic flavor oils, flavorings and/or oils derived from plants, leaves, flowers, fruits and so forth and combinations thereof. Representative flavor oils include: chocolate, cocoa, cocoa butter, root beer, cinnamon oil, oil of wintergreen (methysalicylate) and peppermint oils as well as their flavoring replacements. Also useful are artificial, natural or synthetic fruit flavors such as citrus oil including lemon, orange, grape, lime and grapefruit, kola flavor and fruit essences including apple, strawberry, cherry, pineapple, banana and so forth. Other fruit flavors well known to the art are also employable. Mixtures can be employed.

The amount of flavoring agent employed is normally a matter of preference subject to such factors as flavor type, base type and strength desired. In general, amounts of about 0.05% to about 3.0% by weight of the final chewing gum composition are useable with amounts of about 0.3% to about 1.5% being preferred.

In a preferred embodiment of the present invention, a chewing gum composition is prepared that has a rich chocolate flavor taste. By using a combination of cocoa powder and chocolate oil flavor, a storage stable product is able to be produced. Heretofore, the use of conventional water containing chewing gum compositions with chocolate flavors which contained cocoa butter fat resulted in a product having a bitter taste and soapy texture. This effect resulted from the emulsification of the fat and the splitting of the fat molecules into fatty acids, such as lauric acid, and caproic acid. This basically destroyed the gum system, making the gum too soft, sloppy and rancid tasting. In the preferred composition of the invention, cocoa powder containing cocoa butter fat is used as a source of flavor. The cocoa powder may contain varying amounts of cocoa butter fat and preferably contains about 8% to about 15% fat and most preferably about 10% to about 12% fat by weight. Besides aiding in enhancing flavor taste, the cocoa powder aids in plastization of the gum base. Preferred amounts used in the invention are from about 0.2% to about 3% to about 3% and most preferably about 0.5% to about 1% by weight. When using cocoa powder, it is also preferably to employ a ready source of chocolate flavor which can be conveniently achieved with cocoa butter (theobroma oil) or chocolate, natural or artificial. Preferred amounts are from about 0.8% to about 3% by weight, and most preferably about 1% to about 2% by weight. The use of both ingredients together with the anhydrous gum base and composition of the invention provides for improved stability, improved texture, and flavored products.

The present invention includes a method for preparing a chewing gum composition, including both chewing gum and bubble gum formulations. The gum base is conventionally melted at temperatures that may range from about 60° to about 120° C. for a period of time sufficient to render the base molten. For example, the gum base may be heated under these conditions for a period of about thirty minutes just prior to mixing with the remaining ingredients of the gum composition.

The order of addition of the remaining ingredients is not critical. A preferred procedure involves mixing the gum base with the softener until a uniform homogenous mass is obtained, then a portion of the sweetening agent (normally one-half) and the maltodextrin are added to the heated gum base and blending continued until a homogenous mass is prepared, preferably up to five minutes. Finally, the remaining sweetener and flavor are added and again blended to form a uniform composition. Finally, heating is discontinued and remainder of the ingredients to added to the composition, including the colorant, if any, and other adjuvants, are added and the resulting composition is then mixed for a period of time that may range as high as thirty minutes, to form a fully uniform composition. The mass is then removed from the mixer and is allowed to cool further and may thereafter be formed into various final shapes by known gum manufacturing techniques. For example, the mass may be rolled in contact with a conventional dusting medium, such as calcium carbonate, mannitol, talc and others.

The gum compositions of the present invention may be prepared into all the various end forms known commercially, including slab form, stick form, cube form and center-filled form. All of the techniques associated with the preparation of the products in these forms are well known and the present method may vary somewhat depending upon the specific end product to be manufactured without departing from the essential parameters relating to the exclusion of water. Such other details are presented for purposes of illustration, and to provide a best mode for the practice of the invention, and therefore the invention should not be limited to those parameters.

A preferred process of preparing a chewing gum composition which has an initial soft-short texture lacking elasticity and which converts upon chewing to an elastic-cohesive chewing gum involves: (a) admixing a chewing gum base at a temperature from about 60° C. to about 90° C. with a softener to obtain a homogenous pliable mixture; (b) while mixing add to the homogenous pliable mixture a sweetening agent and a maltodextrin in the amount of 0.75% to about 6% by weight and having a D.E. value of about 7 to about 27; (c) add the remaining chewing gum ingredients and mix until a uniform mass is obtained; and (d) thereafter form the mixture into suitable chewing gum shapes.

The following examples are given to illustrate the invention, but are not deemed to be limiting thereof. All percentages given throughout the specification are based on the weight of the final composition unless otherwise indicated.

EXAMPLE I

This example demonstrates the preparation of bubble gum compositions using various amounts and types of maltodextrin binders.

Bubble gum formulations were prepared with the ingredients recited in Table I. The formulations were prepared by first melting the gum base at a temperature from 82° to 95° C. and mixing the gum base in a kettle with lecithin and filler for about two minutes to obtain a homogeneous mixture. To this mixture is added the maltodextrin binder and ½ sugar sweetener, and mixing continued for several minutes. Thereafter the remaining ingredients were mixed into the mixture for approximately 4 minutes.

The gum was then discharged and formed into chunks and cooled to room temperature.

In order to evaluate the chewing gum formulations a comparison was undertaken with several control formulations.

The final formulations were subjected to test panel studies with multiple panelists. The panelists chewed each piece and separately recorded their observations concerning texture and flavor release. The results demonstrated that the inventive formulations covered a chewing gum product that had an initial soft-short texture which was non-elastic and upon chewing for several minutes became a cohesive and elastic chewing gum structure having a distinctive flavor sense.

Comparative Run A

This batch could not be considered gum. It disintegrated upon initial chew, never to come together in a uniform mass.

Comparative Run B

This batch was better than B. It was very, very soft in initial bite and was chewable until a half minute. However it was very sloppy in intermediate chew.

Comparative Run C

The addition of both dextrose and maltodextrin resulted in a chewing gum that was very cohesive and had an initial harder bite.

Comparative Run D

This batch investigated a lower maltodextrin content (7%) and higher dextrose content. Both the initial and intermediate texture were cohesive and elastic.

Inventive Run 1

Reduction of maltodextrin content to 3% and using a dextrose content of 10% produced an acceptable product. The initial bite was soft-short texture which converts to a soft elastic product upon chewing.

Inventive Run 2

The use of the same dextrose/maltodextrin ratio as E, but substituting a higher DE maltodextrin resulted in a good chewing gum product. The initial bite was soft and nonelastic which upon chewing for 3 minutes become elastic and cohesive.

Inventive Run 3

The use of very high DE maltodextrin (DE 19-24) resulted in a good product with an initial soft nonelastic texture converting to a soft, cohesive, elastic texture upon chewing for 3 minutes.

TABLE I

| Ingredient | Comparative Runs | | | | Inventive Runs | | |
|---|---|---|---|---|---|---|---|
| | A | B | B | D | 1 | 2 | 3 |
| Gum Base | 15.50 | 15.50 | 15.50 | 15.50 | 15.50 | 15.50 | 15.50 |
| Filler | 4.00 | 4.00 | 4.00 | 4.00 | 4.00 | 4.00 | 4.00 |
| Lecithin | 0.50 | 0.50 | 0.50 | 0.50 | 0.50 | 0.50 | 0.50 |
| Color | 0.17 | 0.17 | 0.17 | 0.17 | 0.17 | 0.17 | 0.17 |
| Glycerin | 10.0 | 10.0 | 10.0 | 10.0 | 10.0 | 10.0 | 10.0 |
| Flavour | 1.09 | 1.09 | 1.09 | 1.09 | 1.09 | 1.09 | 1.09 |
| Triacetin | 0.1 | 0.1 | — | — | — | 0.1 | 0.1 |
| Cocoa Powder | 0.87 | 0.87 | 0.87 | 0.87 | 0.87 | 0.87 | 0.87 |
| Sugar | 67.77 | 57.77 | 53.87 | 44.87 | 54.87 | 54.77 | 54.77 |
| Dextrose | — | 10.0 | 3.0 | 16 | 10 | 10 | 10 |
| Maltodextrin DE 8-11 | — | — | 11.0 | 7 | 3 | — | — |
| Maltodextrin DE 11-19 | — | — | — | — | — | 3 | — |
| Maltodextrin DE 19-24 | — | — | — | — | — | — | 3 |

EXAMPLE II

This example demonstrates the preparation of various chewing gums having different chocolate based flavors.

The chewing gum formulations were prepared according to the procedure of Example I. The particular formulations are recited in Table II.

The formulations were subjected to test panel studies using multiple panelists. The results demonstrated that all products exhibited an initial soft, short nonelastic texture which upon chewing converted within two minutes to a soft cohesive, elastic chewing gum product.

TABLE II

| | Chocolate Marshmallow Vanilla | Chocolate/ Vanilla/ Strawberry (Neopolitan) | Chocomint | Root- Beer Float |
|---|---|---|---|---|
| Gum Base | 19.5% | 19.5% | 19.5% | 19.5% |
| Lecithin | 0.15 | 0.15 | 0.5 | 0.5 |
| Sugar | 53.49 | 55.03 | 54.77 | 51.99 |
| Maltodextrin | 3.00 | 3.00 | 3.00 | 3.00 |
| Glycerin | 11.00 | 10.00 | 10.00 | 13.00 |
| Cocoa Powder | 1.50 | 1.05 | 0.875 | 0.75 |
| Color | 0.165 | 0.165 | 0.165 | 0.165 |
| Cerelose (Dextrose) | 10.00 | 10.00 | 10.00 | 10.00 |

TABLE II-continued

| | Chocolate Marshmallow Vanilla | Chocolate/ Vanilla/ Strawberry (Neopolitan) | Chocomint | Root-Beer Float |
|---|---|---|---|---|
| Chocolate/Vanilla Flavoring | 1.20 | — | — | — |
| Chocolate/Vanilla/ Strawberry | — | 1.11 | — | — |
| Chocolate/Mint Flavor | — | — | 1.087 | — |
| Chocolate/Vanilla/ Rootbeer Flavor | — | — | — | 1.00 |
| Triacetin | — | — | 0.10 | 0.10 |

EXAMPLE III

This example demonstrates the preparation of various chewing gums having a strawberry flavor.

The chewing gum formulations were prepared according to the procedure of Example I. The particular formulations are recited in Table III.

The formulations were subjected to test panel studies using multiple panelists. The results are as follows:

Comparative Run A

This batch was produced without the maltodextrin binder and fell apart upon chewing. This is not an acceptable product.

Inventive Run 1

The formula in A was modified by adding 0.75% maltodextrin of a high DE (19-24). The maltodextrin made the chew more cohesive than A and became elastic-cohesive within 3 minutes of chewing.

Inventive Run 2

This formula is the same as Inventive Run 2 but wins a lower DE maltodextrin. The lower DE had the effect of making the chew more cohesive. The product was very acceptable; soft-short texture in initial chew which came together as a soft elastic cohesive product upon chewing.

TABLE III

| Ingredient | Comparative Run A | Inventive Run 1 | Inventive Run 2 |
|---|---|---|---|
| Gum Base | 15.50 | 15.50 | 15.50 |
| Filler | 4.00 | 4.00 | 4.00 |
| Lecithin | 0.50 | 0.50 | 0.50 |
| Color | 0.13 | 0.13 | 0.13 |
| Glycerin | 15.0 | 15.0 | 15.0 |
| Flavour | 0.46 | 0.46 | 0.46 |
| Sugar | 64.41 | 63.66 | 63.66 |
| Maltodextrin DE 8-11 | — | — | 0.75 |
| Maltodextrin DE 19-24 | — | 0.75 | — |

The invention being thus described, it will be obvious that the same may be varied in many ways. Such variations are not to be regarded as a departure from the spirit of scope of the invention and all such modifications are intended to be included within the scope of the claims.

What is claimed is:

1. A chewing gum composition having a short, soft non-elastic texture which comprises a substantially anhydrous mixture of a gum base, sweetening agent, from about 5 to about 18% by weight of a softener and a maltodextrin binder, the latter present in the amount of amount 0.75% to about 6% by weight having a DE value of about 7 to about 27 wherein the composition converts upon chewing to an elastic-cohesive chewing gum.

2. The chewing gum composition of claim 1 wherein the maltodextrin is present in an amount of about 2% to about 5% by weight and have a D.E. value of about 10 to 24.

3. The chewing gum composition of claim 1 wherein the maltodextrin is present in an amount of about 2.5% to about 4% by weight and has a D.E. value of about 18 to about 24.

4. The chewing gum composition of claim 1 which contains
    (a) from about 5% to about 45% by weight gum base;
    (b) from about 25% to about 75% by weight sweetening agent;
    (c) from about 0.75% to about 6% by weight maltodextrin having a D.E. value of about 7 to about 27; and
    (d) from about 5% to about 15% by weight softener wherein said chewing gum composition contains less than about 2% water by weight.

5. The chewing gum composition of claim 1 wherein the gum base comprises a natural or synthetic rubber.

6. The chewing composition of claim 5 wherein the natural rubber is selected from the group consisting of chicle, jelutong, balata, gutta-percha, lechi caspi, sorva, guayule and mixtures thereof.

7. The chewing gum composition of claim 5 wherein the synthetic rubber is selected from the group consisting of butadiene-styrene copolymers, polyisobutylene, isobutylene-isoprene copolymers and mixtures thereof.

8. The chewing gum composition of claim 1 wherein the sweetening agent is selected from the group consisting of water-soluble sweetening agents, water-soluble artificial sweeteners, dipeptide based sweeteners and mixtures thereof.

9. The chewing gum composition of claim 1 wherein the gum base is a chewing gum base or a bubble gum base.

10. The chewing gum composition of claim 1 additionally containing a material selected from the group consisting of coloring agent, emulsifier, filler, flavoring agent, and mixtures thereof.

11. The chewing gum composition of claim 10 wherein the flavoring agent is selected from the group consisting of chocolate, cocoa, cocoa butter, root beer, spearmint oil, cinnamon oil, oil of wintergreen (methylsalicylate), peppermint oil, lemon oil, orange oil, grape flavor, lime oil, grapefruit oil, kola flavor, apple essence, strawberry essence, cherry essence, pineapple essence and a citrus combination.

12. The chewing gum composition of claim 11 wherein the flavoring agent is a combination of cocoa powder and chocolate flavor.

13. A chewing gum composition having a short, soft non-elastic texture which comprises a substantially anhydrous admixture of a gum base, sweetening agent, from about 5 to about 18% by weight of a softener, dextrose and a maltodextrin binder, the latter present in the amount of 0.75% to about 6% by weight, having a DE value of about 7 to about 27 and flavoring comprising cocoa butter and chocolate wherein the composition converts upon chewing to an elastic-cohesive chewing gum and the dextrose is present in an amount of 15 to 1 parts dextrose to 1 part maltodextrin.

14. A process of preparing a chewing gum composition which has an initial soft-short texture lacking elasticity and which converts upon chewing to an elastic-cohesive chewing gum which comprises:
(a) admixing a chewing gum base at a temperature from about 70° C. to about 120° C. with a softener to obtain a homogeneous pliable mixture;
(b) while mixing add to the homogenous pliable mixture a sweetening agent and a maltodextrin the latter present in the amount of about 0.75% to about 6% by weight and having a D.E. value of about 7 to about 27;
(c) add the remaining chewing gum ingredients and mix until a uniform mass is obtained; and
(d) thereafter form the mixture into suitable chewing gum shapes.

* * * * *

UNITED STATES PATENT AND TRADEMARK OFFICE
CERTIFICATE OF CORRECTION

PATENT NO. : 4,604,287
DATED : August 5, 1986
INVENTOR(S) : Michael Glass et al.

It is certified that error appears in the above-identified patent and that said Letters Patent is hereby corrected as shown below:

Claim 1, Column 10, line 2:
    Change "amount" to "about"
    Change "DE" to "D.E."

Claim 2, Column 10, line 8:
    Change "have" to "has"

Claim 13, Column 10, line 64:
    Change "DE" to "D.E."

Signed and Sealed this

Twentieth Day of January, 1987

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,604,287

DATED : August 5, 1986

INVENTOR(S) : Michael Glass et al.

It is certified that error appears in the above-identified patent and that said Letters Patent is hereby corrected as shown below:

Claim 1, Column 10, line 2:
  Change "amount" to "about"
  Change "DE" to "D.E."

Claim 2, Column 10, line 8:
  Change "have" to "has"

Claim 13, Column 10, line 64:
  Change "DE" to "D.E."

Signed and Sealed this

Twenty-fourth Day of March, 1987

Attest:

DONALD J. QUIGG

Attesting Officer

Commissioner of Patents and Trademarks